Patented Feb. 8, 1949

2,460,941

UNITED STATES PATENT OFFICE 2,460,941

REACTION OF STILBOESTROL WITH CAMPHOR

Robert Henry Marriott, London, and William Whalley Myddleton, New Malden, England No Drawing. Application August 31, 1945, Serial No. 613,960. In Great Britain August 11, 1944

Section 1, Public Law 690, August 8, 1946
Patent expires August 11, 1964

5 Claims. (Cl. 260—588)

This invention relates to stilboestrol i. e. γ.δ.-4:4'-dihydroxyphenyl-Δ-γ-hexene.

According to the invention a new and useful product is obtained by intimately associating camphor with stilboestrol. For example, a compound or molecular complex which may be used for therapeutical purposes is produced by treatment with camphor, or a therapeutical preparation comprising a mixture of stilboestrol and camphor, both preferably finely ground, is produced so that formation of the compound or molecular complex will subsequently occur.

We have found that the compound or molecular complex is formed by exposure of the stilboestrol to the vapour of camphor even at ordinary temperatures, combination taking place with the slow formation of a crystalline substance having a crystal form different from either that of camphor or the stilboestrol itself.

The combination of stilboestrol and camphor readily occurs when they are dissolved in an organic solvent such as benzene. A surface film of stilboestrol produced by depositing on water a dilute solution in a volatile solvent such as benzene is found to be stabilised when camphor is added to the solution. Surface energy measurements indicate that this modification is associated with the formation of a molecular complex.

A convenient method of preparation is to boil under reflux a solution in benzene of 4 molecular proportions of stilboestrol and 1 molecular proportion of camphor. The product is precipitated by means of hot petroleum ether as a white finely crystalline substance. After washing with petroleum ether the product is found by analysis to be of constant composition containing 4 molecules of stilboestrol combined with 1 molecule of camphor.

The mother liquor after filtering off the new compound will on standing yield a further crop of larger crystals of the same chemical composition but possessing a yellow colour.

The same product may be obtained by treating in a similar manner a benzene solution of other proportions of stilboestrol and camphor.

The camphor-stilboestrol compound has a melting point of circa 164° C. but the exact melting point is difficult to determine owing to the lack of stability of the compound at elevated temperatures. On heating in air at 90–95° C. it loses camphor and reverts to stilboestrol. The loss of camphor is much slower at lower temperatures and the body is comparatively stable at ordinary temperatures. It is soluble in hot benzene but if the solution is allowed to evaporate in air, long needle crystals of a benzene-stilboestrol complex form which on exposure slowly break down leaving opaque fragments of stilboestrol. As the solution becomes more concentrated in respect of the camphor, however, crystals of the camphor-stilboestrol complex begin to settle out.

What we claim is:

1. Process of combining stilboestrol and camphor by exposing the former to the vapour of the latter.

2. Process of combining stilboestrol and camphor by dissolving them in an organic solvent.

3. Process of combining stilboestrol and camphor by heating a solution of the same in benzene.

4. Process of combining stilboestrol and camphor by dissolving them in an organic solvent and precipitating the product by the addition of a non-solvent.

5. Process of combining stilboestrol and camphor by dissolving them in an organic solvent, precipitating the product by the addition of a non-solvent, filtering off the precipitated product, and allowing the filtrate to crystallize.

ROBERT HENRY MARRIOTT.
WILLIAM WHALLEY MYDDLETON.

REFERENCES CITED

The following references are of record in the file of this patent:

Kremann, "Monatsh," vol. 36, 911–21 (1915).
Kremann, "Monatsh," vol. 42, 147–65 (1921).
Eisenlohr, "Berichte," vol. 71B, 1005–13 (1938).